United States Patent
Kalhan et al.

(10) Patent No.: US 11,153,040 B2
(45) Date of Patent: *Oct. 19, 2021

(54) SYSTEM AND METHOD FOR DUAL-CODING TRANSMISSIONS FOR RELAYS

(71) Applicants: Kyocera Corporation, Kyoto (JP);
Amit Kalhan, San Diego, CA (US);
Henry Chang, San Diego, CA (US)

(72) Inventors: Amit Kalhan, San Diego, CA (US);
Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 349 days.

This patent is subject to a terminal disclaimer.

(21) Appl. No.: 16/079,866

(22) PCT Filed: Mar. 17, 2017

(86) PCT No.: PCT/US2017/022971
§ 371 (c)(1),
(2) Date: Aug. 24, 2018

(87) PCT Pub. No.: WO2017/161271
PCT Pub. Date: Sep. 21, 2017

(65) Prior Publication Data
US 2019/0181987 A1    Jun. 13, 2019

Related U.S. Application Data

(60) Provisional application No. 62/310,533, filed on Mar. 18, 2016, provisional application No. 62/310,520, filed on Mar. 18, 2016.

(51) Int. Cl.
*H04L 1/00* (2006.01)
*H04L 1/18* (2006.01)
(Continued)

(52) U.S. Cl.
CPC .......... *H04L 1/1812* (2013.01); *H04B 7/155* (2013.01); *H04B 7/15528* (2013.01); *H04L 1/00* (2013.01);
(Continued)

(58) Field of Classification Search
CPC ....... H04B 7/155; H04B 7/15528; H04L 1/00; H04L 1/0014; H04L 1/0061;
(Continued)

(56) References Cited

U.S. PATENT DOCUMENTS 5,699,367 A    12/1997  Haartsen
2003/0226088 A1*  12/2003  Cameron ............ H03M 13/256
                                                      714/755
(Continued)

*Primary Examiner* — Noel R Beharry
*Assistant Examiner* — M Mostazir Rahman

(57) ABSTRACT

An origination device (e.g., a base station) dual encodes a first set of data (1) according to a first set of encoding parameters corresponding to channel conditions associated with a first communication link, and (2) according to a second set of encoding parameters corresponding to channel conditions associated with a second communication link. The dual-encoded first set of data is transmitted to a signal forwarding device. The signal forwarding device decodes the dual-encoded first set of data, using decoding parameters that correspond to the second set of encoding parameters, to generate a single-encoded first set of data that is encoded according to the first set of encoding parameters. The signal forwarding device transmits a "single-encoded forwarded signal" to the destination device. The destination device decodes the single-encoded forwarded signal using decoding parameters that correspond to the first set of encoding parameters, which yields the first set of data.

19 Claims, 3 Drawing Sheets

(51) Int. Cl.
*H04B 7/155* (2006.01)
*H04L 5/00* (2006.01)

(52) U.S. Cl.
CPC .......... *H04L 1/0014* (2013.01); *H04L 1/0061* (2013.01); *H04L 1/1825* (2013.01); *H04L 5/0055* (2013.01); *H04L 2001/0097* (2013.01)

(58) Field of Classification Search
CPC ................. H04L 1/1812; H04L 1/1825; H04L 2001/0097; H04L 5/0055
See application file for complete search history.

(56) References Cited

U.S. PATENT DOCUMENTS

| | | | |
|---|---|---|---|
| 2004/0157560 A1* | 8/2004 | Yamasaki | H04L 1/0026 455/63.1 |
| 2005/0276259 A1* | 12/2005 | Nakabayashi | H04L 1/0072 370/349 |
| 2008/0062909 A1* | 3/2008 | Shin | H04L 1/0041 370/315 |
| 2010/0077274 A1* | 3/2010 | Kim | H04L 1/0026 714/750 |
| 2013/0135988 A1 | 5/2013 | Kim et al. | |
| 2013/0156098 A1* | 6/2013 | Schwartz | H04N 19/114 375/240.03 |
| 2015/0046775 A1 | 2/2015 | Prodan et al. | |

* cited by examiner

SYSTEM AND METHOD FOR DUAL-CODING TRANSMISSIONS FOR RELAYS

CLAIM OF PRIORITY

The present application claims priority to Provisional Application No. 62/310,533, entitled "SYSTEM AND METHOD FOR DUAL-CODING FOR DUAL-HOPS CHANNELS," filed Mar. 18, 2016, and to Provisional Application No. 62/310,520, entitled "SYSTEM AND METHOD FOR DUAL-CODING TRANSMISSIONS FOR RELAYS," filed Mar. 18, 2016, both assigned to the assignee hereof and hereby expressly incorporated by reference in their entirety.

FIELD

This invention generally relates to wireless communications and more particularly to dual-coding transmissions to a signal forwarding device.

BACKGROUND

Some communication systems utilize a signal forwarding device, such as a repeater station, relay station or a self-backhauled station to facilitate the transfer of information between user equipment (UE) devices and a core network. The signal forwarding device is typically not connected directly to the core network but still provides service to the UE devices by forwarding information to and from the UE devices and a base station, which is connected to the core network. Where the signal forwarding device is a repeater, the repeater simply retransmits downlink signals received from another base station to the UE device and retransmits uplink signals received from the UE device to the other base station. Although the repeater may apply limited signal processing to the incoming signal such as filtering, frequency shifting, and amplification, a repeater will not decode the incoming signal that is to be forwarded. Relay stations and self-backhaul stations perform at least some signal processing before retransmitting the information. Such processing can vary from partial decoding to complete decoding of the incoming signal. For example, the incoming signal can be completely decoded and used to generate a new signal or the incoming signal may not be completely decoded but still used to transmit the forwarded outgoing signal. Some of the various levels of processing (forwarding techniques) are sometimes referred to as amplify and forward (AF), partial decoding and forward (PDF), and decode and forward (DF) schemes.

SUMMARY

An origination device (e.g., a base station) encodes a first set of data according to a first set of encoding parameters corresponding to channel conditions associated with a first communication link between a signal forwarding device and a destination device. The origination device encodes the encoded first set of data, according to a second set of encoding parameters corresponding to channel conditions associated with a second communication link between the origination device and the signal forwarding device, to generate a dual-encoded first set of data. The dual-encoded first set of data is transmitted to the signal forwarding device. The signal forwarding device decodes the dual-encoded first set of data, using decoding parameters that correspond to the second set of encoding parameters, to generate a single-encoded first set of data that is encoded according to the first set of encoding parameters. The signal forwarding device transmits a "single-encoded forwarded signal" to the destination device. The destination device decodes the single-encoded forwarded signal using decoding parameters that correspond to the first set of encoding parameters, which yields the first set of data.

DETAILED DESCRIPTION

As discussed above, communication systems often employ repeaters, relays and self-backhauled base stations to forward signals transmitted between base stations and the UE devices served by the base stations. Signals may be forwarded from the base station to the UE device, from the UE device to the base station, or both. In some systems, scheduling of communication resources for the communication channel between the signal forwarding device (e.g., repeater, relay, etc.) and the UE device is performed by a scheduler at the base station or a central scheduler connected to the base station. In the examples discussed herein, it is assumed that the scheduler is located at, or connected to, a base station to/from which the signal forwarding device forwards signals. However, the scheduler may not be physically located at the base station and may be located at any other suitable location (e.g., at the signal forwarding device or elsewhere in the radio access network to which the base station belongs).

In a typical relay scenario, an anchor base station would only single-encode data, which is intended for a destination device, using encoding parameters that are appropriate for the channel conditions between the base station and the relay node. Upon receipt of the transmission from the base station, the relay node would decode the data and subsequently encode the data using encoding parameters that are appropriate for the channel conditions between the relay and the destination device (e.g., UE device). One drawback of such a scenario is the additional processing delay experienced at the relay while the relay encodes the data before transmitting the data to the destination device. However, for the examples discussed herein, various methods, devices, and systems will be described in which an anchor base station transmits a dual-encoded set of data that does not require any encoding by the signal forwarding device (e.g., relay).

Since the signal forwarding device is central to the examples, the nomenclature used throughout the description centers on the signal forwarding device. More specifically, an "origination device" is a device from which a signal is transmitted to the signal forwarding device, and the signal being received at the signal forwarding device from an origination device is referred to as a "received signal." Similarly, a "destination device" is a device to which the signal forwarding device transmits a signal, which is referred to herein as a "forwarded signal." Moreover, although most of the following examples refer to a base station as the "origination device" and to a UE device as the "destination device," the examples may be modified so that the UE device is the "origination device," and the base station is the "destination device."

Figure 1A:
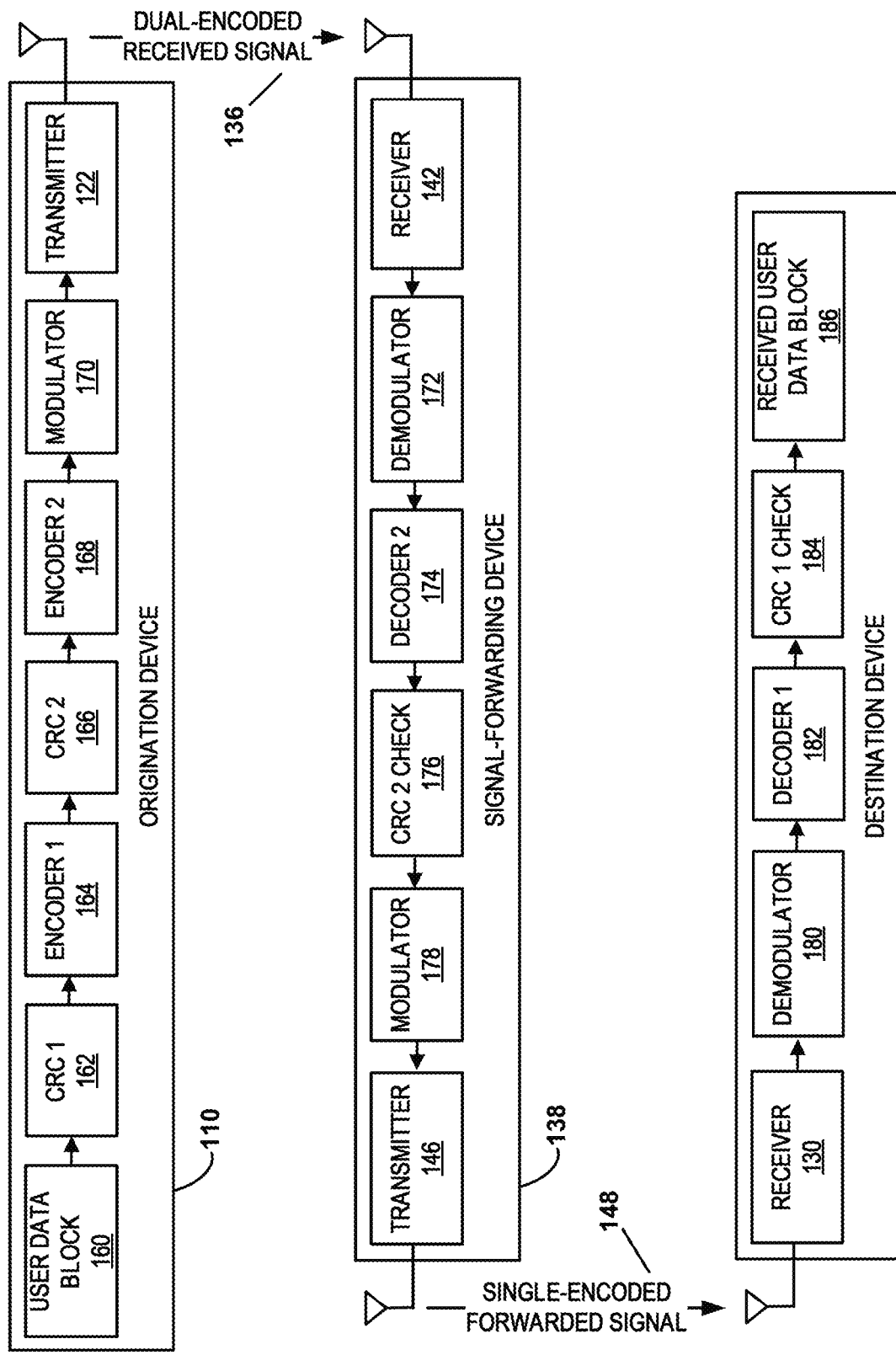
FIG. 1A is a block diagram of an example of the circuitry utilized within an origination device, a signal forwarding device, and a destination device to transmit dual-encoded data.

FIG. 1A is a block diagram of an example of the circuitry utilized within an origination device, a signal forwarding device, and a destination device to transmit dual-encoded data. For example, the various blocks shown in FIG. 1A represent circuitry that is configured to perform various functions and processes described herein. Although each function is shown as a separate box, the circuitry that actually performs the recited functions for each box may be configured to perform the functions for multiple boxes. For example, a controller within the origination device, the signal forwarding device, and/or the destination device may be the circuitry that is configured to perform one or more of the functions shown in FIG. 1A.

The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices.

In the example of FIG. 1A, origination device 110 provides downlink wireless communication service to destination device 114. Thus, destination device 114 receives downlink signals from origination device 110, either directly or via signal forwarding device 138. In the example of FIG. 1A, origination device 110 transmits a dual-encoded data signal to signal forwarding device 138, and signal forwarding device 138 forwards a single-encoded data signal to the destination device 114.

For example, origination device 110 either generates the user data block 160 or receives the user data block 160 from another entity within the radio access network. The user data block 160 is also referred to herein as a "first set of data." The origination device 110 has circuitry configured to add a first cyclic redundancy check value (CRC 1) 162 to the user data block 160. The CRC is an error-detecting code that is used to detect accidental changes to raw data. Although the examples shown herein utilize CRC, any suitable error-detection techniques may be used.

After adding CRC 1, the user data block 160 is encoded by Encoder 1, 164. Encoder 1 encodes the user data block 160 according to a first set of encoding parameters corresponding to channel conditions associated with a first communication link between the signal forwarding device 138 and the destination device 114. The first set of encoding parameters comprises a first encoding technique and/or a first encoding rate. The result of encoding the user data block 160 with Encoder 1 is an encoded first set of data (e.g., encoded user data block).

A second CRC value (CRC 2) 166 is added to the encoded first set of data. Although a CRC is used for CRC 2, any suitable alternative error-detection technique may be used in place of CRC 2. The encoded first set of data, along with CRC 2, is encoded by Encoder 2, 168, which, in the example shown in FIG. 1A, utilizes a non-iterative type encoding/decoding (e.g., Reed-Solomon Codes) to ensure low-latency processing at the signal forwarding device 138. Encoder 2 encodes the encoded first set of data according to a second set of encoding parameters corresponding to channel conditions associated with a second communication link between the origination device 110 and the signal forwarding device 138. The second set of encoding parameters comprises a second encoding technique and/or a second encoding rate. The result of encoding the encoded first set of data with Encoder 2 is a dual-encoded first set of data.

One of the advantages of dual-encoding the data is that the encoding parameters selected for each stage of encoding can be selected based on the channel conditions for a particular communication link. For example, Encoder 1 may encode the first set of data according to a first encoding technique that is better suited for transmissions between a signal forwarding device and a destination device (e.g., mobile UE device), and Encoder 2 may encode the encoded set of data according to a second encoding technique that is better suited for transmissions between an origination device (e.g., base station) and a signal forwarding device. For example, the first encoding technique may be a convolutional coding, which is better suited for transmissions between a signal forwarding device and a destination device, and the second encoding technique may be a turbo coding or rate-less channel coding using the Low Density Parity Codes (LDPC), which is better suited for transmissions between an origination device and a signal forwarding device. However, any of the channel coding techniques may be used for the origination device-to-signal forwarding device channel or the signal forwarding device-to-destination device channel.

Similarly, Encoder 1 may encode the first set of data at a first coding rate that is better suited for transmissions between a signal forwarding device and a destination device (e.g., mobile UE device), and Encoder 2 may encode the encoded set of data at a second coding rate that is better suited for transmissions between an origination device (e.g., base station) and a signal forwarding device. More specifically, the first set of data may be encoded at a ⅓ coding rate, and the encoded set of data may be encoded at a ⅔ coding rate, for example.

Regardless of the particular encoding parameters used, the dual-encoded first set of data is modulated by modulator 170 of origination device 110. In the example shown in FIG. 1A, Quadrature Amplitude Modulation (QAM) is used. However, any other suitable modulation scheme may be used. Moreover, the modulation scheme utilized by modulator 170 may also be selected based on the channel conditions between the origination device 110 and the signal forwarding device 138. The modulation of the dual-encoded first set of data yields a dual-encoded received signal 136.

Origination device 110 utilizes transmitter 122 to transmit the dual-encoded received signal 136 to signal forwarding device 138, which receives the transmission via receiver 142. The demodulator 172 of signal forwarding device 138 demodulates the dual-encoded received signal 136 using a demodulation scheme that corresponds to the modulation scheme utilized by modulator 170. The demodulation of the dual-encoded received signal 136 yields the dual-encoded first set of data.

The Decoder 2, 174, decodes the dual-encoded first set of data, using decoding parameters that correspond to the second set of encoding parameters, which were used by Encoder 2, 168, of the origination device 110 to encode the encoded first set of data. The result of decoding the dual-encoded first set of data with Decoder 2 is a single-encoded first set of data that is encoded according to the first set of encoding parameters. After decoding, the second CRC value (CRC 2), which was added to the encoded first set of data by the origination device 110, is checked by CRC 2 Check 176, which detects whether any errors are present in the single-encoded first set of data after decoding. If the CRC 2 Check 176 detects an error, signal forwarding device 138 can send a negative acknowledgment response (NACK) to the origination device 110, indicating that the dual-encoded received signal 136 was not successfully received. If the CRC 2 Check 176 does not detect an error, signal forwarding device 138 can send a positive acknowledgment response (ACK) to the origination device 110, indicating that the dual-encoded received signal 136 was successfully received.

If there are no errors, modulator 178 of signal forwarding device 138 modulates the single-encoded first set of data. In the example shown in FIG. 1A, Quadrature Amplitude Modulation (QAM) is used by modulator 178. However, any other suitable modulation scheme may be used. Moreover, the modulation scheme utilized by modulator 178 may also be selected based on the channel conditions between the signal forwarding device 138 and the destination device 114. The modulation of the single-encoded first set of data yields a single-encoded forwarded signal 148.

Signal forwarding device 138 utilizes transmitter 146 to transmit the single-encoded forwarded signal 148 to destination device 114, which receives the transmission via receiver 130. The demodulator 180 of destination device 114 demodulates the single-encoded forwarded signal 148 using a demodulation scheme that corresponds to the modulation scheme utilized by modulator 178. The demodulation of the single-encoded forwarded signal 148 yields the single-encoded first set of data.

The Decoder 1, 182, decodes the single-encoded first set of data, using decoding parameters that correspond to the first set of encoding parameters, which were used by Encoder 1, 164, of the origination device 110 to encode the first set of data. The result of decoding the single-encoded first set of data with Decoder 1 is the first set of data. After decoding, the first CRC value (CRC 1), which was added to the first set of data by the origination device 110, is checked by CRC 1 Check 184, which detects whether any errors are present in the first set of data after decoding.

If the CRC 1 Check 184 detects an error, destination device 114 can send a negative acknowledgment response (NACK) to the signal forwarding device 138 and/or the origination device 110, indicating that the single-encoded forwarded signal 148 was not successfully received. If the destination device 114 sends a NACK to the origination device 110, the NACK can be sent either directly to the origination device 110 or to the origination device 110 via signal forwarding device 138. If the CRC 1 Check 184 does not detect an error, destination device 114 can send a positive acknowledgment response (ACK) to the signal forwarding device 138 and/or the origination device 110, indicating that the single-encoded forwarded signal 148 was successfully received. If the destination device 114 sends an ACK to the origination device 110, the ACK can be sent either directly to the origination device 110 or to the origination device 110 via signal forwarding device 138. If there are no errors detected by CRC 1 Check 184, destination device 114 has successfully received and decoded the first set of data (e.g., received user data block 186).

By dual-encoding the first set of data at origination device 110 with first and second sets of encoding parameters that are selected based on the channel conditions associated with (1) the communication link between the signal forwarding device 138 and the destination device 114, and (2) the communication link between the origination device 110 and the signal forwarding device 138, respectively, a more robust data delivery system is created.

Figure 1B:
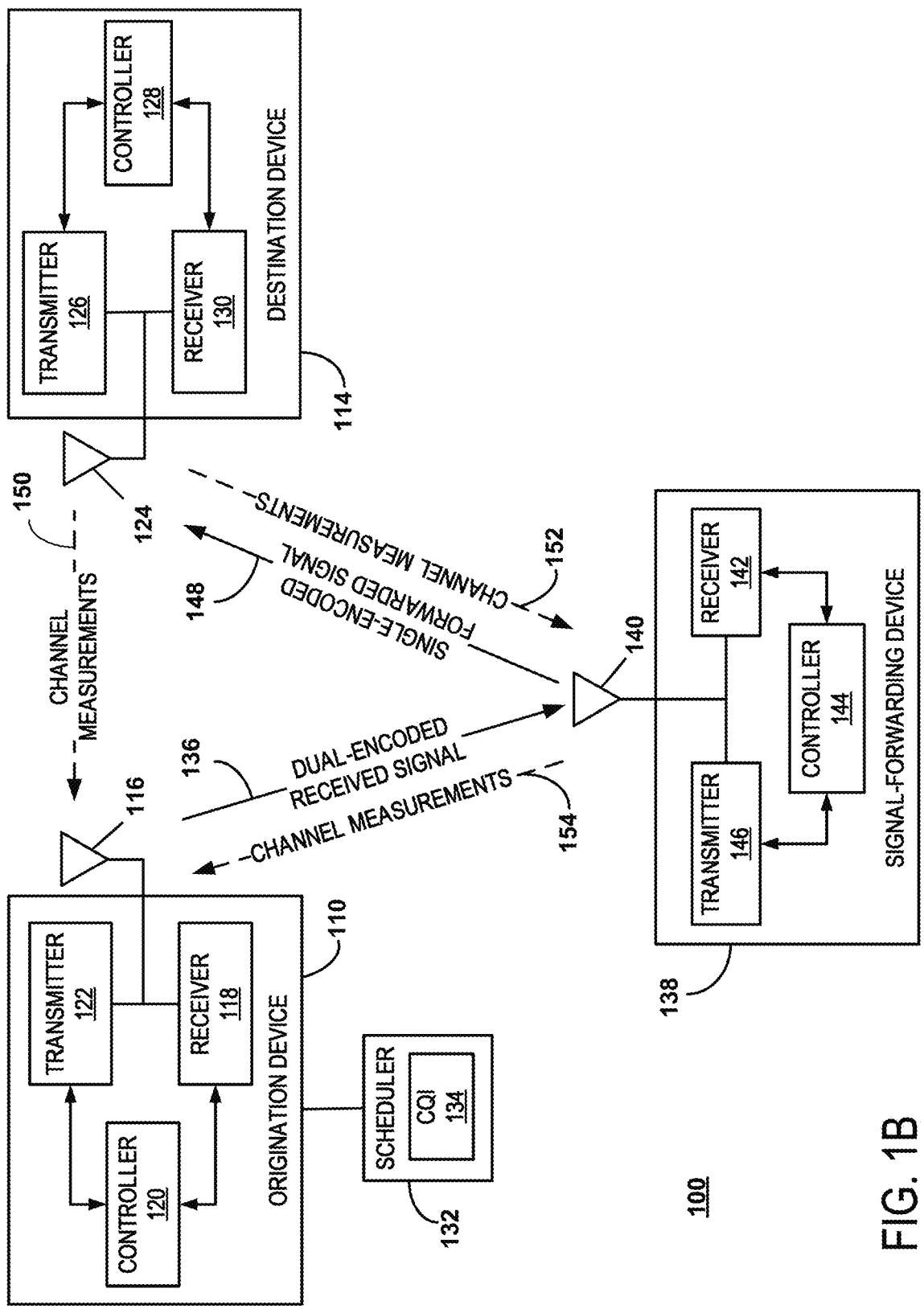
FIG. 1B is a block diagram of an example of a wireless communication system including an origination device, a signal forwarding device, and a destination device.

FIG. 1B is a block diagram of an example of a wireless communication system 100 including an origination device, a signal forwarding device, and a destination device. The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices.

In the example of FIG. 1B, origination device 110 provides downlink wireless communication service to destination device 114. Thus, destination device 114 receives downlink signals (not shown) from origination device 110, either directly or via signal forwarding device 138. The downlink signals are received at the destination device 114 through antenna 124 and receiver 130. Destination device 114 further comprises a controller 128 and a transmitter 126. Origination device 110 transmits the downlink signals to destination device 114 and to signal forwarding device 138 via antenna 116 and transmitter 122.

Origination device 110 further comprises controller 120 and transmitter 122, as well as other electronics, hardware, and code. The origination device 110 is any fixed, mobile, or portable equipment that performs the functions described herein. The various functions and operations of the blocks described with reference to the origination device 110 may be implemented in any number of devices, circuits, or elements. Two or more of the functional blocks may be integrated in a single device, and the functions described as performed in any single device may be implemented over several devices.

For the example shown in FIG. 1B, the origination device 110 may be a fixed device or apparatus that is installed at a particular location at the time of system deployment. Examples of such equipment include fixed base stations or fixed transceiver stations. In some situations, the origination device 110 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the origination device 110 may be a portable device that is not fixed to any particular location. Accordingly, the origination device 110 may be a portable user device such as a UE device in some circumstances.

The controller 120 includes any combination of hardware, software, and/or firmware for executing the functions described herein as well as facilitating the overall functionality of the origination device 110. An example of a suitable controller 120 includes code running on a microprocessor or processor arrangement connected to memory. The transmitter 122 includes electronics configured to transmit wireless signals. In some situations, the transmitter 122 may include multiple transmitters. The receiver 118 includes electronics configured to receive wireless signals. In some situations, the receiver 118 may include multiple receivers. The receiver 118 and transmitter 122 receive and transmit signals, respectively, through an antenna 116. The antenna 116 may include separate transmit and receive antennas. In some circumstances, the antenna 116 may include multiple transmit and receive antennas.

The transmitter 122 and receiver 118 in the example of FIG. 1B perform radio frequency (RF) processing including modulation and demodulation. The receiver 118, therefore, may include components such as low noise amplifiers (LNAs) and filters. The transmitter 122 may include filters and amplifiers. Other components may include isolators, matching circuits, and other RF components. These components in combination or cooperation with other components perform the origination device functions. The required components may depend on the particular functionality required by the origination device.

The transmitter 122 includes modulator 170 (shown in FIG. 1A), and the receiver 118 includes a demodulator (not shown). The modulator 170 modulates the signals to be transmitted as part of the dual-encoded received signal 136 and can apply any one of a plurality of modulation orders. The demodulator demodulates any signals received at the origination device 110 in accordance with one of a plurality of modulation orders.

Scheduler 132 is located at origination device 110 in the example shown in FIG. 1B. However, the system 100 could be modified so that the scheduler 132 is located at any other suitable location. Regardless of the location of scheduler 132, the system 100 may be configured so that multiple entities within the radio access network (e.g., different origination devices, different signal forwarding devices, and different destination devices) can access the scheduler 132. For example, in an ad-hoc topology, a first origination device can access the scheduler 132 and transmit a dual-encoded received signal to the signal forwarding device at a given time, but a second origination device can access the scheduler 132 and transmit a dual-encoded received signal to the signal forwarding device at a second, different time.

The scheduler may be an application running on equipment connected directly to origination device 110 or connected through a backhaul or other communication link. Regardless of the location of scheduler 132, channel quality information (CQI) 134 regarding the various communication links within the system 100 is provided to scheduler 132, which uses the CQI 134 to schedule communication resources to be used by the various entities within the system 100. For the example shown in FIG. 1B, the scheduler 132 utilizes CQI pertaining to the communication link between the origination device 110 and the destination device 114, CQI pertaining to the communication link between the origination device 110 and the signal forwarding device 138, and CQI pertaining to the communication link between the signal forwarding device 138 and the destination device 114. Based on the channel quality for at least one of these three communication links, the scheduler 132 schedules communication resources.

As discussed above, origination device 110 of FIG. 1B transmits a dual-encoded received signal 136 (e.g. a downlink signal) to the signal forwarding device 138, which receives the dual-encoded received signal 136 via antenna 140 and receiver 142. The signal forwarding device 138 further comprises controller 144 and transmitter 146, as well as other electronics, hardware, and code. The signal forwarding device 138 is any fixed, mobile, or portable equipment that performs the functions described herein. The various functions and operations of the blocks described with reference to the signal forwarding device 138 may be implemented in any number of devices, circuits, or elements. Two or more of the functional blocks may be integrated in a single device, and the functions described as performed in any single device may be implemented over several devices.

For the example shown in FIG. 1B, the signal forwarding device 138 may be a fixed device or apparatus that is installed at a particular location at the time of system deployment. Examples of such equipment include fixed base stations or fixed transceiver stations. In some situations, the signal forwarding device 138 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer.

In still other situations, the signal forwarding device 138 may be a portable device that is not fixed to any particular location. Accordingly, the signal forwarding device 138 may be a portable user device such as a UE device in some circumstances. In some implementations, the signal forwarding device 138 may be a base station, eNB, or access point that performs signal forwarding functions in addition to serving UE devices. For example, a self-backhauled eNB, connected to an anchor eNB, may be configured to perform signal forwarding functions for some UE devices in addition to directly serving other UE devices utilizing the wireless backhaul to the origination device 110 (e.g., anchor eNB). In other implementations, the signal forwarding device 138 may be a drone with cellular capability. Such a drone can easily move about towards locations where the existing coverage from fixed base stations is lacking.

The controller 144 includes any combination of hardware, software, and/or firmware for executing the functions described herein as well as facilitating the overall functionality of the signal forwarding device 138. An example of a suitable controller 144 includes code running on a microprocessor or processor arrangement connected to memory. The transmitter 146 includes electronics configured to transmit wireless signals. In some situations, the transmitter 146 may include multiple transmitters. The receiver 142 includes electronics configured to receive wireless signals. In some situations, the receiver 142 may include multiple receivers. The receiver 142 and transmitter 146 receive and transmit signals, respectively, through an antenna 140. The antenna 140 may include separate transmit and receive antennas. In some circumstances, the antenna 140 may include multiple transmit and receive antennas.

The transmitter 146 and receiver 142 in the example of FIG. 1B perform radio frequency (RF) processing including modulation and demodulation. The receiver 142, therefore, may include components such as low noise amplifiers (LNAs) and filters. The transmitter 146 may include filters and amplifiers. Other components may include isolators, matching circuits, and other RF components. These components in combination or cooperation with other components perform the signal forwarding functions. The required components may depend on the particular signal forwarding scheme that is employed.

The transmitter 146 includes modulator 178 (shown in FIG. 1A), and the receiver 142 includes demodulator 172 (shown in FIG. 1A). The modulator modulates the signals to be transmitted as part of the single-encoded forwarded signal 148 and can apply any one of a plurality of modulation orders. The demodulator demodulates the dual-encoded received signal 136 in accordance with one of a plurality of modulation orders. The modulation order for transmissions to the destination device 114, however, is established by scheduler 132.

As is known, the modulation order determines the number of bits used to generate the modulated symbol. There is a trade-off between modulation order, required energy, and bit-error rate (BER). As the modulation order is increased, the average energy per bit must also be increased to maintain the same BER. In the example shown in FIG. 1B, the signal forwarding device 138 utilizes a lower-order modulation symbol to modulate the single-encoded first set of data before transmitting the single-encoded forwarded signal 148. This scenario occurs because a typical link between the signal forwarding device 138 and the destination device 114 has a relatively lower signal-to-noise ratio (SNR) compared to the link between the origination device 110 and the signal forwarding device 138. In some situations, for example, the origination device-to-signal forwarding device (OD-SFD) channel between the origination device 110 and the signal forwarding device 138 is typically static because both devices are fixed, whereas the signal forwarding device-to-destination device (SFD-DD) channel between the signal forwarding device 138 and the destination device 114 is generally dynamic because the destination device 114 is mobile. Accordingly, the origination device 110 may utilize a higher-order modulation order when the communication link between the origination device 110 and the signal forwarding device 138 is static, which yields a relatively higher SNR compared to the communication link between the signal forwarding device 138 and the destination device 114.

As described above, the signal forwarding device 138 receives the dual-encoded received signal 136 with antenna 140 and receiver 142. The signal forwarding device 138 demodulates the dual-encoded received signal 136 with demodulator 172 of FIG. 1A, which yields the dual-encoded first set of data. The dual-encoded first set of data is decoded with Decoder 2, 174, of FIG. 1A, which yields a single-encoded first set of data. The single-encoded first set of data is modulated with modulator 178 of FIG. 1A, which yields a single-encoded forwarded signal 148.

The signal forwarding device 138 transmits the single-encoded forwarded signal 148 via transmitter 146 and antenna 140 to the destination device 114. In this manner, the signal forwarding device 138 transmits the single-encoded first set of data, which is contained in the single-encoded forwarded signal 148, to the destination device 114. For the examples discussed herein, the single-encoded forwarded signal 148 is transmitted within a single frequency band of the SFD-DD channel. The incoming dual-encoded received signal 136 is transmitted within an origination device-to-signal forwarding device channel (OD-SFD channel), which also includes a single frequency band. However, any combination of frequency bands and frequency sub-bands may be used for the OD-SFD channel and the SFD-DD channel.

In some examples, upon receiving the dual-encoded received signal 136, the controller 144 of the signal forwarding device 138 is configured to measure the dual-encoded received signal 136 to obtain channel measurements associated with the OD-SFD channel between the origination device 110 and the signal forwarding device 138. After measuring the dual-encoded received signal 136, the transmitter 146 of the signal forwarding device 138 transmits the OD-SFD channel measurements to the origination device 110. The OD-SFD channel measurements are transmitted to origination device 110, as indicated by dashed signal line 154 in FIG. 1B. In this manner, the origination device 110, using receiver 118, receives channel feedback regarding the channel conditions associated with the communication link between the origination device 110 and the signal forwarding device 138. Of course, in other examples, the origination device 110 can also obtain its own channel measurements regarding the channel conditions associated with the communication link between the origination device 110 and the signal forwarding device 138 by measuring incoming signals from the signal forwarding device 138. After receiving the channel feedback, controller 120 of origination device 110 can modify the set of encoding parameters used by Encoder 2, 168, based on the received channel feedback regarding the channel conditions associated with the communication link between the origination device 110 and the signal forwarding device 138.

The destination device 114 receives the single-encoded forwarded signal 148 via antenna 124 and receiver 130. The destination device 114 further comprises controller 128 and transmitter 126, as well as other electronics, hardware, and code. The destination device 114 is any fixed, mobile, or portable equipment that performs the functions described herein. The various functions and operations of the blocks described with reference to the destination device 114 may be implemented in any number of devices, circuits, or elements. Two or more of the functional blocks may be integrated in a single device, and the functions described as performed in any single device may be implemented over several devices.

The controller 128 includes any combination of hardware, software, and/or firmware for executing the functions described herein as well as facilitating the overall functionality of the destination device 114. An example of a suitable controller 128 includes code running on a microprocessor or processor arrangement connected to memory. The transmitter 126 includes electronics configured to transmit wireless signals. In some situations, the transmitter 126 may include multiple transmitters. The receiver 130 includes electronics configured to receive wireless signals. In some situations, the receiver 130 may include multiple receivers. The receiver 130 and transmitter 126 receive and transmit signals, respectively, through an antenna 124. The antenna 124 may include separate transmit and receive antennas. In some circumstances, the antenna 124 may include multiple transmit and receive antennas.

The transmitter 126 and receiver 130 in the example of FIG. 1B perform radio frequency (RF) processing including modulation and demodulation. The receiver 130, therefore, may include components such as low noise amplifiers (LNAs) and filters. The transmitter 126 may include filters and amplifiers. Other components may include isolators, matching circuits, and other RF components. These components in combination or cooperation with other components perform the destination device functions. The required components may depend on the particular functionality required by the destination device.

The transmitter 126 includes a modulator (not shown), and the receiver 130 includes demodulator 180 (shown in FIG. 1A). The modulator modulates the signals to be transmitted as part of the channel measurement signals 150, 152 and can apply any one of a plurality of modulation orders. The demodulator demodulates the single-encoded forwarded signal 148 in accordance with one of a plurality of modulation orders.

As described above, the destination device 114 receives the single-encoded forwarded signal 148 with antenna 124 and receiver 130. The destination device 114 demodulates the single-encoded forwarded signal 148 with demodulator 180 of FIG. 1A, which yields the single-encoded first set of data. The single-encoded first set of data is decoded with Decoder 1, 182, of FIG. 1A, which yields the first set of data (e.g., received user data block 186).

In some examples, upon receiving the single-encoded forwarded signal 148, the controller 128 of the destination device 114 is configured to measure the single-encoded forwarded signal 148 to obtain channel measurements associated with a signal forwarding device-to-destination device (SFD-DD) channel between the signal forwarding device 138 and the destination device 114. After measuring the single-encoded forwarded signal 148, the transmitter 126 of destination device 114 transmits the SFD-DD channel measurements to the origination device 110. The SFD-DD channel measurements can be transmitted directly to origination device 110, as indicated by dashed signal line 150 in FIG. 1B. Alternatively, the SFD-DD channel measurements can be initially transmitted to signal forwarding device 138, as indicated by dashed signal line 152, and signal forwarding device 138 can subsequently transmit the SFD-DD channel measurements to origination device 110, as indicated by dashed signal line 154. Of course, in other examples, the signal forwarding device 138 can also obtain its own channel measurements regarding the channel conditions associated with the communication link between the signal forwarding device 138 and the destination device 114 by measuring incoming signals from the destination device 114. The signal forwarding device 138 may then transmit its own channel measurements to the origination device 110. Thus, there are multiple ways in which the origination device 110, using receiver 118, can receive channel feedback regarding the channel conditions associated with the communication link between the signal forwarding device 138 and the destination device 114. After receiving the channel feedback, controller 120 of origination device 110 can modify the set of encoding parameters used by Encoder 1, 164, based on the received channel feedback regarding the channel conditions associated with the communication link between the signal forwarding device 138 and the destination device 114.

In some examples, destination device 114 can also transmit the SFD-DD channel measurements to origination device 110, either directly or indirectly through signal forwarding device 138, as part of a feedback signal. Alternatively, the SFD-DD channel measurements can be transmitted separately from the feedback signal. For example, the feedback signal can include a downlink channel feedback report comprising downlink channel measurements related to one or more downlink signals received by the destination device 114. For example, the downlink channel feedback report may contain downlink channel measurements for downlink signals received from the origination device 110 and/or downlink channel measurements for one or more downlink signals received from one or more base stations other than origination device 110. The downlink channel feedback report can additionally include the location of the resources (e.g., time slots, subcarriers, reference signal, etc.) on which the downlink channel measurements were made.

The downlink channel feedback report may also identify a carrier on which the downlink channel measurements were made, a cell identifier associated with origination device 110 that transmitted the downlink signals, and/or a spatial vector associated with a beamformed downlink signal. In some examples, the downlink channel feedback report may identify a cell identifier associated with a base station, other than origination device 110, that transmitted the downlink signal. This scenario might occur when the downlink signal is received from a base station other than origination device 110, but the destination device 114 needs to submit the downlink channel feedback report to the scheduler 132 located at the origination device 110.

In yet another scenario, destination device 114 can receive downlink signals from a first device (e.g., origination device 110), as the primary carrier of the downlink signals, and can also receive downlink signals from a second device (e.g., signal forwarding device 138 or a base station other than origination device 110), as the secondary carrier of the downlink signals. In such a scenario, the downlink channel feedback report may (1) identify the primary carrier and/or the secondary carrier on which the downlink channel measurements were made, (2) include a cell identifier associated with the first device that transmitted the primary carrier and/or a cell identifier associated with the second device that transmitted the secondary carrier, and/or (3) include a spatial vector associated with each of one or more beamformed downlink signals, respectively.

Alternatively, the feedback signal can include an acknowledgment response, which can be either a positive acknowledgment response (ACK) or a negative acknowledgment response (NACK). The ACK message indicates that a downlink signal was successfully received by the destination device 114. The NACK message indicates that the downlink signal was not successfully received by the destination device 114. In some situations, the ACK/NACK message is a message that is forwarded on to the origination device 110 by the signal forwarding device 138. In other situations, it a message intended for the signal forwarding device 138. In still other situations, the ACK message can be an indication to both the signal forwarding device 138 and the origination device 110. In scenarios in which the feedback signal includes an acknowledgment response, the feedback signal may additionally identify a carrier on which the downlink signal was received, a cell identifier associated with origination device 110 that transmitted the downlink signal, a cell identifier associated with a base station, other than origination device 110, that transmitted the downlink signal, and/or a spatial vector associated with a beamformed downlink signal. Regardless of the contents of the feedback signal, the SFD-DD channel measurements can be transmitted along with, or separate from, the feedback signal to the origination device 110, either directly or through signal forwarding device 138.

If system 100 of FIG. 1B utilizes a Hybrid Automatic Repeat Request (HARQ) process for error-correction and error-control, origination device 110 can be configured to alter its retransmission functionality, depending on which HARQ process configuration is currently being implemented. For example, in a first HARQ configuration, if the signal forwarding device 138 is unable to decode the dual-encoded received signal 136, then the signal forwarding device 138 transmits a NACK to the origination device 110 for retransmission. Similarly, if the destination device 114 is unable to decode the single-encoded forwarded signal 148, then the destination device 114 transmits a NACK to the signal forwarding device 138, which forwards the NACK to the origination device 110 to request retransmission. The same procedure is utilized for sending the ACK for both the OD-SFD communication link and the SFD-DD communication link. The ACK/NACK from the destination device 114 can be transmitted to the origination device 110, either directly or via the signal forwarding device 138. Thus, each ACK/NACK transmitted from the signal forwarding device 138 and the destination device 114 includes an identifier in order to identify the device that initially transmitted the ACK/NACK. In some cases, the HARQ Process ID may also be used. When using the HARQ mechanism, the receiver and the transmitter should know some information about the Process ID for each of the HARQ processes, so that the receiver can successfully track each of the HARQ process data without getting them mixed up. In this case the HARQ process ID could be included along with the identifier for the identity of the device.

The second HARQ configuration is similar to the first HARQ configuration with one main difference. In the second HARQ configuration, the signal forwarding device 138 refrains from sending its own ACK/NACK to the origination device 110 until after the signal forwarding device 138 receives the ACK/NACK from the destination device 114. Upon receipt of the ACK/NACK from the destination device 114, the signal forwarding device 138 transmits an ACK/NACK, indicating whether retransmission is requested from the origination device 110. The second HARQ configuration is relatively efficient compared to the first HARQ configuration.

The third HARQ configuration is similar to the second HARQ configuration with a significant difference in the manner in which retransmissions are handled. For example, in the third HARQ configuration, the origination device 110 transmits at least one retransmission to the signal forwarding device 138, regardless of whether the origination device 110 receives an ACK/NACK from either the signal forwarding device 138 or the destination device 114. For example, origination device 110 would (1) transmit a first dual-encoded received signal to the signal forwarding device 138, and (2) subsequently re-transmit the same first dual-encoded received signal to the signal forwarding device 138 without waiting for an ACK/NACK. The retransmission of the same first dual-encoded received signal is sent in case a NACK is subsequently transmitted to origination device 110.

The third HARQ configuration is relatively inefficient in relatively good channel conditions. However, in relatively poor channel conditions, the third HARQ configuration has lower latency since the signal forwarding device 138 does not have to wait for retransmission from the origination device 110 if the destination device 114 sends a NACK. Stated differently, the origination device 110 does not wait for the NACK, which corresponds with a previously transmitted signal, from the destination device 114 before the retransmission is sent. Although the example described above only utilizes one automatic retransmission, the third HARQ configuration could be set up to automatically transmit any additional number of retransmissions. Moreover, in some examples, the number of automatic retransmissions can be dynamically altered, based on the channel conditions of the communication links within system 100.

Figure 2:
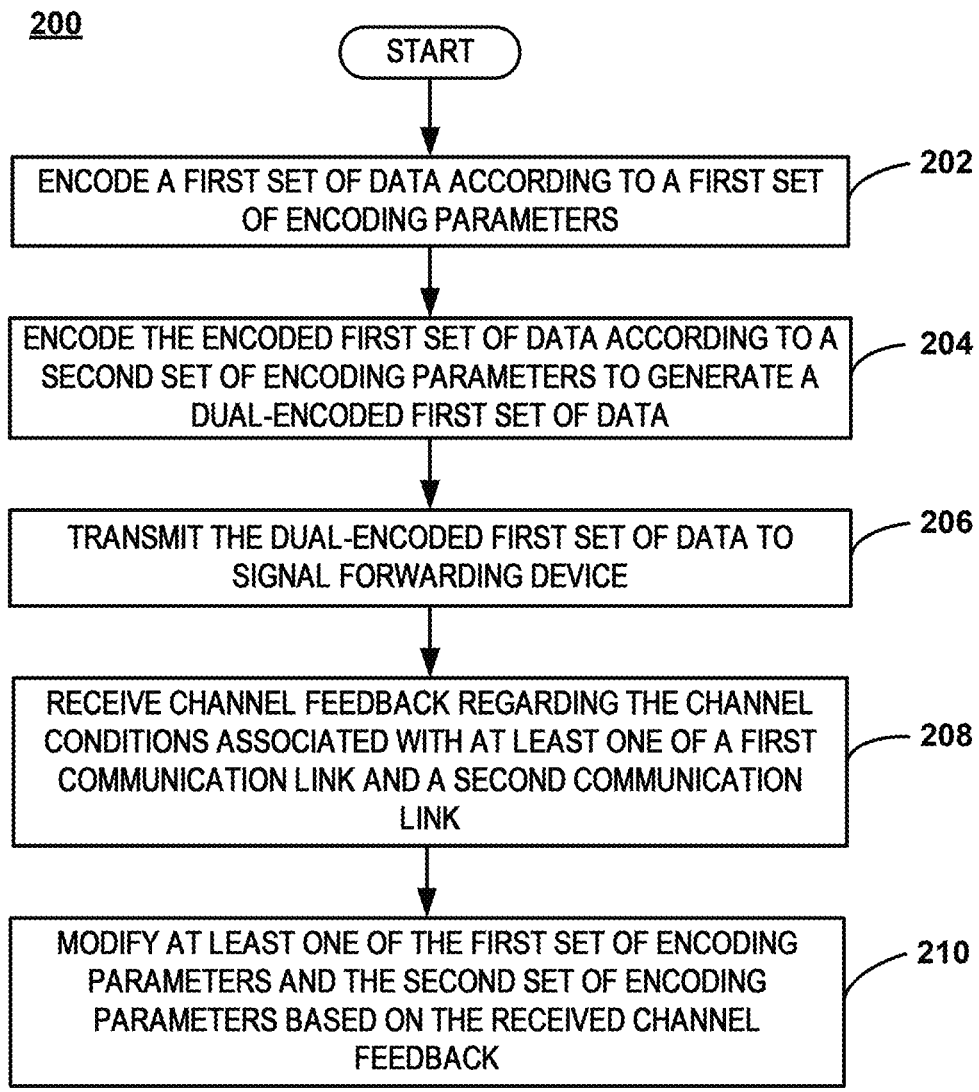
FIG. 2 is a flowchart of an example of a method of utilizing the wireless communication system of FIG. 1B to transmit dual-encoded data.

FIG. 2 is a flowchart of an example of a method 200 of utilizing the wireless communication system of FIG. 1B to transmit dual-encoded data. The method begins, at step 202, with encoding a first set of data according to a first set of encoding parameters. As described above, the first set of encoding parameters corresponds to channel conditions associated with a first communication link between the signal forwarding device 138 and the destination device 114. The first set of encoding parameters may include a first encoding technique and/or a first encoding rate. The result of step 202 is an encoded first set of data.

At step 204, the encoded first set of data is encoded according to a second set of encoding parameters. The second set of encoding parameters corresponds to channel conditions associated with a second communication link between the origination device 110 and the signal forwarding device 138. The second set of encoding parameters may include a second encoding technique and/or a second encoding rate. The result of step 204 is a dual-encoded first set of data.

At step 206, the origination device 110 transmits a dual-encoded received signal 136, which contains the dual-encoded first set of data, to the signal forwarding device 138. The signal forwarding device 138 decodes the dual-encoded first set of data, using decoding parameters that correspond to the second set of encoding parameters, to generate a single-encoded first set of data that is encoded according to the first set of encoding parameters. The signal forwarding device 138 transmits a single-encoded forwarded signal 148, which contains the single-encoded first set of data, to destination device 114. The signal forwarding device 138 can also measure the dual-encoded received signal 136 to obtain channel measurements associated with the communication link between the origination device 110 and the signal forwarding device 138.

The destination device 114 receives the single-encoded first set of data and decodes the single-encoded first set of data, using decoding parameters that correspond to the first set of encoding parameters, which yields the first set of data. The destination device 114 can also measure the single-encoded forwarded signal 148 to obtain channel measurements associated with the communication link between the signal forwarding device 138 and the destination device 114.

At step 208, the origination device 110 receives channel feedback regarding the channel conditions associated with (1) the communication link between the origination device 110 and the signal forwarding device 138, and/or (2) the communication link between the signal forwarding device 138 and the destination device 114. The channel measurements that reflect the channel conditions can be transmitted to origination device 110, either directly or via signal forwarding device 138. As mentioned above, the channel measurements can also be transmitted to origination device 110 as part of a feedback/acknowledgment signal. In the interest of system efficiency, the channel measurements may be sent as part of a feedback/acknowledgment signal, depending on a configured periodicity or a trigger defined by the origination device 110. At step 210, the origination device 110 modifies at least one of the first set of encoding parameters and the second set of encoding parameters, based on the received channel feedback.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
    encoding a first set of data, according to a first set of encoding parameters corresponding to channel conditions associated with a first wireless communication link between a signal forwarding device and a destination device; and
    encoding the encoded first set of data, according to a second set of encoding parameters corresponding to channel conditions associated with a second wireless communication link between an origination device and the signal forwarding device, to generate a dual-encoded first set of data.

2. The method of claim 1, wherein the first set of encoding parameters comprises a first encoding technique, and wherein the second set of encoding parameters comprises a second encoding technique.

3. The method of claim 1, wherein the first set of encoding parameters comprises a first encoding rate, and
wherein the second set of encoding parameters comprises a second encoding rate.

4. The method of claim 1, further comprising:
transmitting the dual-encoded first set of data to the signal forwarding device.

5. The method of claim 4, further comprising:
receiving channel feedback regarding the channel conditions associated with the first wireless communication link between the signal forwarding device and the destination device.

6. The method of claim 5, further comprising:
modifying the first set of encoding parameters based on the received channel feedback regarding the channel conditions associated with the first wireless communication link between the signal forwarding device and the destination device.

7. The method of claim 4, further comprising:
receiving channel feedback regarding the channel conditions associated with the second wireless communication link between the origination device and the signal forwarding device.

8. The method of claim 7, further comprising:
modifying the second set of encoding parameters based on the received channel feedback regarding the channel conditions associated with the second wireless communication link between the origination device and the signal forwarding device.

9. A wireless communication device comprising:
circuitry configured to:
encode a first set of data, according to a first set of encoding parameters corresponding to channel conditions associated with a first wireless communication link between a signal forwarding device and a destination device, and
encode the encoded first set of data, according to a second set of encoding parameters corresponding to channel conditions associated with a second wireless communication link between an origination device and the signal forwarding device, to generate a dual-encoded first set of data; and
a transmitter configured to transmit the dual-encoded first set of data.

10. The wireless communication device of claim 9, wherein the first set of encoding parameters comprises a first encoding technique, and
wherein the second set of encoding parameters comprises a second encoding technique.

11. The wireless communication device of claim 9, wherein the first set of encoding parameters comprises a first encoding rate, and
wherein the second set of encoding parameters comprises a second encoding rate.

12. The wireless communication device of claim 9, further comprising:
a receiver configured to receive channel feedback regarding the channel conditions associated with at least one of the first wireless communication link and the second wireless communication link.

13. The wireless communication device of claim 12, further comprising:

a controller configured to modify at least one of the first set of encoding parameters and the second set of encoding parameters, based on the received channel feedback.

14. A wireless communication system comprising:
an origination device comprising:
circuitry configured to:
encode a first set of data, according to a first set of encoding parameters corresponding to channel conditions associated with a first wireless communication link between a signal forwarding device and a destination device, and
encode the encoded first set of data, according to a second set of encoding parameters corresponding to channel conditions associated with a second wireless communication link between an origination device and the signal forwarding device, to generate a dual-encoded first set of data, and
a transmitter configured to transmit the dual-encoded first set of data;
the signal forwarding device comprising:
a receiver configured to receive the dual-encoded first set of data,
circuitry configured to decode, using decoding parameters that correspond to the second set of encoding parameters, the dual-encoded first set of data to generate a single-encoded first set of data that is encoded according to the first set of encoding parameters, and
a transmitter configured to transmit the single-encoded first set of data; and
the destination device comprising:
a receiver configured to receive the single-encoded first set of data, and
circuitry configured to decode, using decoding parameters that correspond to the first set of encoding parameters, the single-encoded first set of data.

15. The wireless communication system of claim 14, wherein the first set of encoding parameters comprises a first encoding technique, and
wherein the second set of encoding parameters comprises a second encoding technique.

16. The wireless communication system of claim 14, wherein the first set of encoding parameters comprises a first encoding rate, and
wherein the second set of encoding parameters comprises a second encoding rate.

17. The wireless communication system of claim 14, wherein the origination device further comprises:
a receiver configured to receive channel feedback regarding the channel conditions associated with at least one of the first wireless communication link and the second wireless communication link.

18. The wireless communication system of claim 17, wherein the origination device further comprises:
a controller configured to modify at least one of the first set of encoding parameters and the second set of encoding parameters, based on the received channel feedback.

19. The wireless communication system of claim 14, wherein the origination device is configured to send at least one retransmission of the dual-encoded first set of data without waiting for a request for retransmission.

* * * * *